US 6,574,952 B2

(12) United States Patent
Boman

(10) Patent No.: US 6,574,952 B2
(45) Date of Patent: Jun. 10, 2003

(54) APPARATUS FOR CONTROLLING THE FLOW SEPARATION LINE OF ROCKET NOZZLES

(75) Inventor: Arne Boman, Lidkoping (SE)

(73) Assignee: Volvo Aero Corporation, Trolhättan (SE)

( * ) Notice: Subject to any disclaimer, the term of this patent is extended or adjusted under 35 U.S.C. 154(b) by 0 days.

(21) Appl. No.: 09/980,456

(22) PCT Filed: Mar. 16, 2001

(86) PCT No.: PCT/SE01/00554

§ 371 (c)(1),
(2), (4) Date: Nov. 15, 2001

(87) PCT Pub. No.: WO01/69069

PCT Pub. Date: Sep. 20, 2001

(65) Prior Publication Data

US 2002/0152752 A1 Oct. 24, 2002

(30) Foreign Application Priority Data

Mar. 17, 2000 (SE) ................................................ 0000896

(51) Int. Cl.⁷ ................................................ F02K 1/00
(52) U.S. Cl. .............................. 60/271; 60/242; 60/615; 239/265.11
(58) Field of Search .......................... 60/770, 264, 267, 60/204, 242, 615, 721; 239/265.11, 265.17, 265.19

(56) References Cited

U.S. PATENT DOCUMENTS

| 3,712,546 | A |   | 1/1973 | Kaufmann | ............. | 239/265.11 |
| 3,925,982 | A | * | 12/1975 | Mueller | ....................... | 60/242 |
| 5,363,645 | A |   | 11/1994 | Pellet | ......................... | 60/267 |
| 5,450,720 | A | * | 9/1995 | Vuillamy et al. | ............. | 60/271 |
| 5,619,851 | A | * | 4/1997 | Johnson et al. | .............. | 60/267 |
| 6,176,077 | B1 | * | 1/2001 | Haggander et al. | ........... | 60/271 |

* cited by examiner

Primary Examiner—Charles G. Freay
Assistant Examiner—Han L. Liu
(74) Attorney, Agent, or Firm—Dickstein Shapiro Morin & Oshinsky, LLP

(57) ABSTRACT

The invention refers to an apparatus for controlling the flow separation line of rocket nozzles for reducing side loads. For obtaining this control it is suggested according to the invention that the inside of the nozzle (1) has circumferentially regular spaced areas (2) with increased surface roughness compared with the rest of the inside of the nozzle.

10 Claims, 2 Drawing Sheets

APPARATUS FOR CONTROLLING THE FLOW SEPARATION LINE OF ROCKET NOZZLES

BACKGROUND OF THE INVENTION

1. Field of the Invention

The invention refers to an apparatus for controlling the flow separation line of rocket nozzles for reducing the side loads on said nozzles.

2. Description of the Related Art

During start-up and stop transients in sea level rocket engines significant dynamic and static loads, often called side loads, occur. These loads are generally attributed to the disordered flow characteristics of the flow during flow separation. These side loads usually limit the size of the nozzle that can be used and thereby the performance of the rocket engine.

There are principally two ways of operating a rocket engine nozzle with respect to flow separation:

a) The first way and the way all nozzles starting at sea level are operated today is that they are designed to operate full flowing, that means without flow separation during nominal operation. However, during the engine start-up there is a short period of side loads when the nozzle during transient conditions in not full flowing. This period of time is typically less than two seconds and the side loads will disappear when the pressure of the combustion gases in the nozzle reaches its nominal value.

b) The second way which is not used today is to have a continuous flow separation during steady-state operation. The flow separation in the nozzle will progress until the rocket reaches an altitude where the pressure in the atmosphere has decreased to a level allowing the nozzle to be full flowing.

The invention intends to achieve control of the side loads both under transient conditions and under steady-state conditions.

Nozzles for liquid propellant rocket engines often operate at conditions where the main jet exhaust into a non-negligible ambient pressure. Examples of such rocket engines are large liquid propellant sea level rocket engines for boosters and upper stage engines for multi-stage rockets.

The side loads that are generated on such nozzles are generally of such a magnitude that they present constraints for the design of the components carrying the nozzle. These constraints result in higher weight of the nozzle itself and the components carrying the nozzle. The largest possible area ratio that can be used is furthermore limited by requirement of full flow function under steady-state conditions.

The final consequences of the side loads are constraints on the overall performance-to-weight ratio of the nozzle and the subsequent limitation of the amount of payload that can be delivered into orbit by the rocket launcher.

For eliminating the drawbacks of prior art nozzles a number of techniques have been suggested which all have turned out to have themselves significant drawbacks in various respects. The drawbacks refer to function, performance, cooling and reliability.

Thus, traditional bell-shaped nozzles have a limit function and substantial start and stop transient loads. A dual bell nozzle also suffers from severe transient side loads.

A known technique for reducing the side loads of a bell-shaped nozzle is to provide the nozzle with trip rings which reduces the side loads, but the trip rings will induce a performance loss when the nozzle is full flowing and it is also difficult to cool said rings.

Another known technique for reducing the side loads of a nozzle is to provide said nozzle with an exit diffusor at the nozzle end, which reduces the effective area ratio of the nozzle. The exit diffusor increases the weight of the nozzle and said exit diffusor must be dropped at high altitude, which require means for active control and moving parts. Also the heat load on the exit diffusor is very high.

Yet another known technique for reducing the side loads of a nozzle is to place an ablative insert on the inside of the nozzle wall, which insert is ablated as the rocket engine burns and is totally gone when the nozzle reaches high altitude. The drawbacks with this technique is that the nozzle will be heavier and one cannot guarantee that the insert will ablate evenly around the circumference.

Yet another known technique for reducing the side loads of a nozzle is to provide fens stretching in the axial direction of the nozzle on the inside of the nozzle forcing the flow separation to be more axi-symmetrical. The flow at the wall will be divided in pockets between said fens. Hereby large areas of different wall pressure causing side loads are avoided. The draw-backs with this technique is that the nozzle will be heavier and the fens will be exposed to an extreme heat load, since they are mounted normal to the nozzle wall and extend into the main jet. Furthermore, they are difficult to cool.

SUMMARY OF THE INVENTION

The object of the invention is to eliminate the above-mentioned drawbacks of the prior art.

According to the invention this is achieved in that the inside of the nozzle has circumferentially regularly spaced areas with increased surface roughness compared with the rest of the inside of the nozzle.

BRIEF DESCRIPTION OF THE DRAWINGS

A non-limiting example of the invention will now be described with reference to the accompanying drawings, in which.

DETAILED DESCRIPTION OF THE PREFERRED EMBODIMENTS

Figure 1:
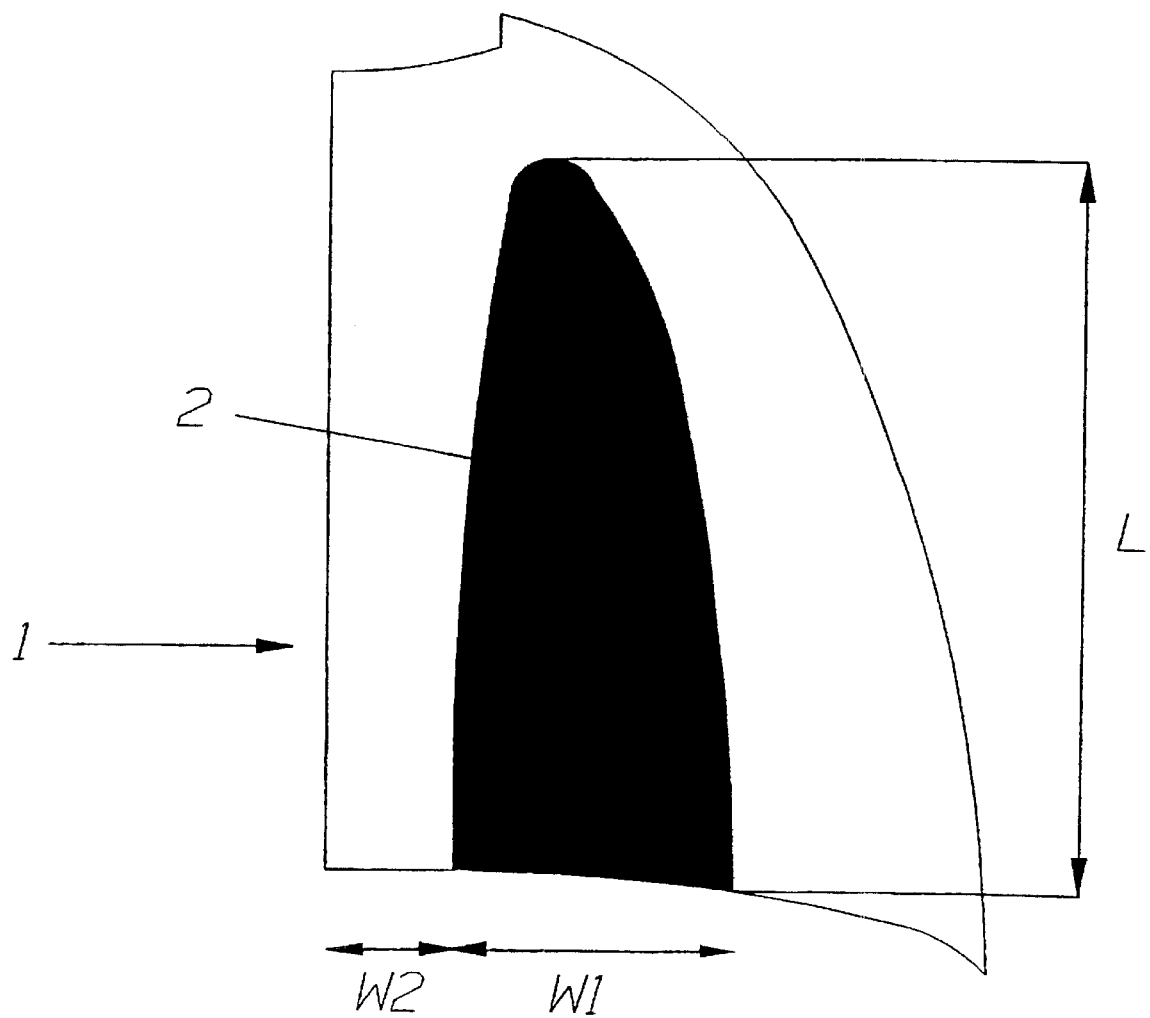
FIG. 1 shows a broken view of a bell-shaped nozzle with an area, the surface roughness of which has been increased.

As seen in FIG. 1 the inside of the wall of a nozzle 1 has circumferentially regularly spaced areas 2 with a variation in surface roughness. This variation in surface roughness is formed in axial direction over the whole length L of the nozzle 1 or of a part of the nozzle and extends to the outlet of the nozzle.

As seen in FIG. 1 the areas 2 with increased surface roughness extend over at least a part of the length L of the nozzle, and the width W1 of said areas at the outlet of the nozzle is smaller than, equal to or larger than the width W2 of adjacent areas with non-increased surface roughness.

The shape of the area 2 with increased surface roughness can be triangular, rectangular or can have the form of a constant curve (polynominal).

The increased surface roughness can be achieved by, for instance, machining, such as grinding or milling or by flame or plasma spraying. The surface roughness must be so large that it penetrates the viscous sub-layer of the boundary layer at the nozzle wall. Therefore, the surface roughness on the inside of large nozzles for sea level operation will exceed 1 mm at the outlet. The surface roughness can vary or be constant over the whole length of the nozzle with the largest surface roughness nearest the outlet of the nozzle. The surface roughness can vary between about 0.5–2 mm.

Since the surface roughness varies in the direction of the circumference of the nozzle 1 the boundary layer is effected at the nozzle wall and thereby the flow separation line.

Figure 2A:
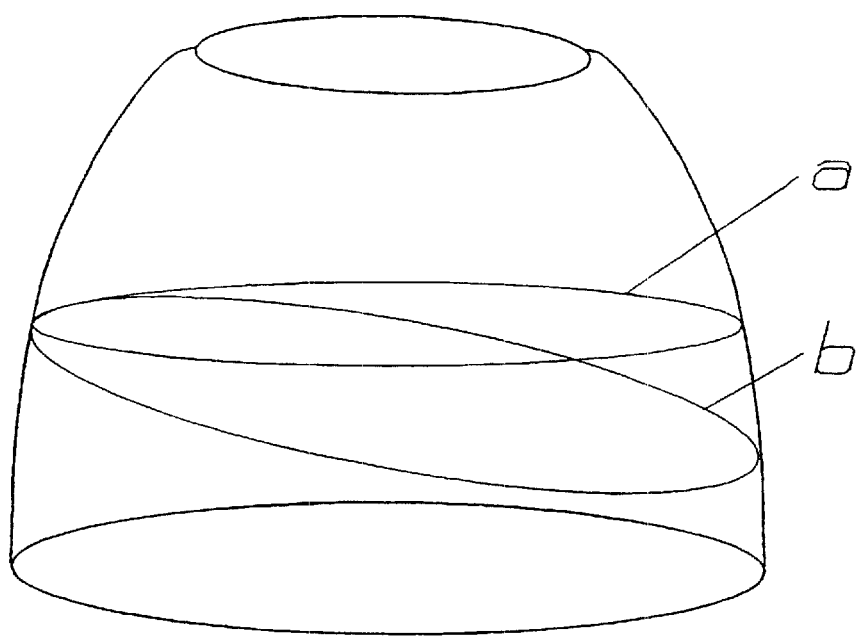
FIG. 2a is a schematic view of the separation line in a known rotational symmetric bell-shaped nozzle.
Figure 2B:
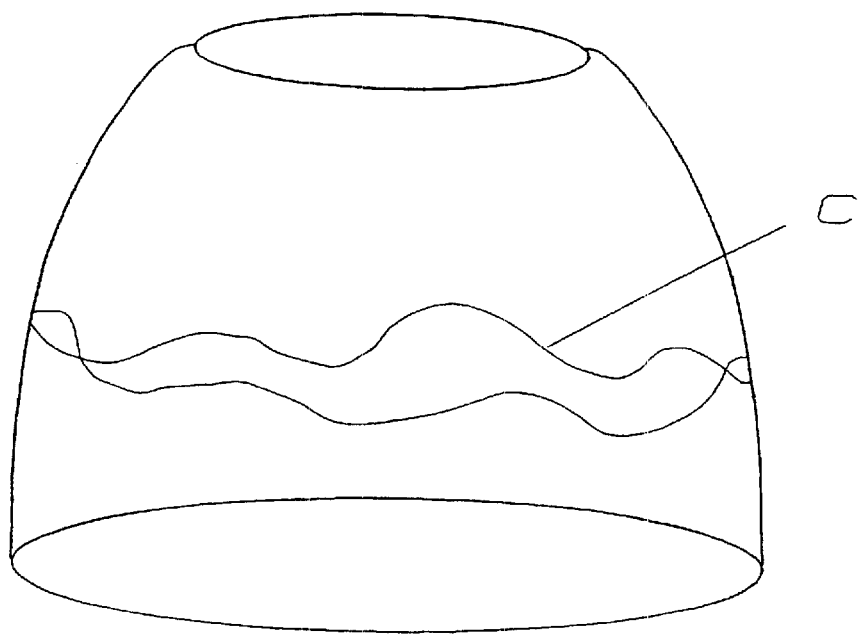
FIG. 2b is a schematic view of the separation line of a nozzle according to the invention.

As can be seen from FIG. 2b the flow separation line c has, in a nozzle with varying surface roughness on the inside of the nozzle wall, wave shape, and the side loads on the nozzle wall will thereby be relatively evenly spaced along the nozzle. The separation plane forming the wave shaped separation line c results in smaller areas with different pressure compared to if the separation line and thereby the separation plane b is inclined, see FIG. 2a. A wave formed motion of a separation line will not expose the nozzle wall for side loads with the same size as a linear separation line. The separation plane is to its nature not stable and will incline randomly if the nozzle operates under separated condition, see FIG. 2a. The separation line a in FIG. 2a forms an optimal separation line in view of that the pressure on the nozzle wall has the same size at the same distance from the outlet of the nozzle. This means that no side loads are formed on the nozzle.

Since, according to the invention, the inside of the nozzle wall has circumferentially regularly spaced areas with larger surface roughness than the rest of the inside of the nozzle the flow separation line can be controlled, and it will thereby be possible to increase the area ration of the nozzle and to use a nozzle with continuous flow separation during steady-state operation, which has not been possible with present nozzles.

What is claimed is:

1. A rocket nozzle having an interior wall provided with circumferentially regularly spaced areas of increased surface roughness relative to non-roughened areas of the interior wall of the nozzle.

2. The rocket nozzle of claim 1, wherein the nozzle has an inlet and an outlet, and the surface roughness provided on the interior wall of the nozzle increases progressively from the inlet to the outlet of the nozzle, said surface roughness at the outlet of the nozzle exceeding 1 mm.

3. The rocket nozzle of claim 2, wherein:

said nozzle has an inlet, an outlet and a length (L), the areas with increased surface roughness extend over at least a part of the length (L) and have a circumferential width (W1), the non-roughened areas have a circumferential width (W2), and the circumferential width (W1) of the areas with increased surface roughness at the outlet of the nozzle is equal to the circumferential width (W2) of adjacent non-roughened areas.

4. The rocket nozzle of claim 2, wherein:

said nozzle has an inlet, an outlet and a length (L), the areas with increased surface roughness extend over at least a part of the length (L) and have a circumferential width (W1), the non-roughened areas have a circumferential width (W2), and the circumferential width (W1) of the areas with increased surface roughness at the outlet of the nozzle is less than the circumferential width (W2) of adjacent non-roughened areas.

5. The rocket nozzle of claim 2, wherein:

said nozzle has an inlet, an outlet and a length (L), the areas with increased surface roughness extend over at least a part of the length (L) and have a circumferential width (W1), the non-roughened areas have a circumferential width (W2), and the circumferential width (W1) of the areas with increased surface roughness at the outlet of the nozzle is greater than the circumferential width (W2) of adjacent non-roughened areas.

6. The rocket nozzle of claim 2, wherein said surface roughness increases from about 0.5 mm at said inlet to about 2.0 mm at said outlet.

7. The rocket nozzle of claim 1, wherein:

said nozzle has an inlet, an outlet and a length (L), the areas with increased surface roughness extend over at least a part of the length (L) of the nozzle and have a circumferential width (W1), the non-roughened areas have a circumferential width (W2), and the circumferential width (W1) of the areas with increased surface roughness at the outlet of the nozzle is less than the circumferential width (W2) of adjacent non-roughened areas.

8. The rocket nozzle of claim 1, wherein:

said nozzle has an inlet, an outlet and a length (L), the areas with increased surface roughness extend over at least a part of the length (L) of the nozzle and have a circumferential width (W1), the non-roughened areas have a circumferential width (W2), and the circumferential width (W1) of the areas with increased surface roughness at the outlet of the nozzle is equal to the circumferential width (W2) of adjacent non-roughened areas.

9. The rocket nozzle of claim 1, wherein:

said nozzle has an inlet, an outlet and a length (L), the areas with increased surface roughness extend over at least a part of the length (L) of the nozzle and have a circumferential width (W1), the non-roughened areas have a circumferential width (W2), and the circumferential width (W1) of the areas with increased surface roughness at the outlet of the nozzle is greater than the circumferential width (W2) of adjacent non-roughened areas.

10. The rocket nozzle of claim 1, wherein said nozzle is substantially bell shaped.

* * * * *